US008712467B2

(12) United States Patent
Clark et al.

(10) Patent No.: US 8,712,467 B2
(45) Date of Patent: Apr. 29, 2014

(54) MULTIPLE RF BAND OPERATION IN MOBILE DEVICES

(75) Inventors: Mark Clark, Aptos, CA (US); Steve Evans, Aptos, CA (US); Stephen Cahill, Felton, CA (US)

(73) Assignee: Plantronics, Inc., Santa Cruz, CA (US)

( * ) Notice: Subject to any disclaimer, the term of this patent is extended or adjusted under 35 U.S.C. 154(b) by 984 days.

(21) Appl. No.: 12/769,368

(22) Filed: Apr. 28, 2010

(65) Prior Publication Data

US 2011/0269502 A1    Nov. 3, 2011

(51) Int. Cl.
*H04M 1/00* (2006.01)
*H04B 1/00* (2006.01)
*H04B 15/00* (2006.01)

(52) U.S. Cl.
USPC .................................. 455/552.1; 455/63.1

(58) Field of Classification Search
USPC .............. 455/552.1, 41.2, 41.3, 575.2, 168.1, 455/176.1, 180.1, 188.1, 63.1, 114.2, 278.1, 455/296

See application file for complete search history.

(56) References Cited

U.S. PATENT DOCUMENTS

| 6,909,737 B1 * | 6/2005 | Kockmann et al. ........... 375/133 |
| 7,395,061 B2 * | 7/2008 | Hundal et al. ............. 455/426.1 |
| 2007/0135122 A1 * | 6/2007 | Dillon et al. ................ 455/433 |

* cited by examiner

*Primary Examiner* — Eugene Yun
(74) *Attorney, Agent, or Firm* — Chuang Intellectual Property Law

(57) ABSTRACT

Methods and apparatuses for multiple RF band operation in mobile devices are disclosed. In one example, a method for dual radio frequency band operation includes operating a mobile communication device in a first radio frequency band, monitoring a RSSI associated with the mobile communication device, and switching operation of the mobile communication device to operation in a second radio frequency band responsive to the RSSI crossing a threshold RSSI value.

15 Claims, 8 Drawing Sheets

MULTIPLE RF BAND OPERATION IN MOBILE DEVICES

BACKGROUND OF THE INVENTION

Digital Enhanced Cordless Telecommunications (DECT) is a European Telecommunications Standards Institute (ETSI) standard for mobile digital telephones. DECT telephones are commonly used in both home and office environments. DECT telephones utilize RF technology in the Unlicensed Personal Communications Services (UPCS) band at 1910 to 1930 MHz as defined for the USA/South America by the FCC or can be configured to operate in the European DECT band at 1880 to 1900 MHz. DECT telephones utilize channels which are exclusively reserved for voice communications applications, and may offer extended range relative to short-range wireless communication protocols.

However, DECT telephones have a limited number of carrier frequencies. For example, the number of carrier frequencies in the DECT 6.0 protocol in the United States is limited to five. Due to the limited number of carrier frequencies, the density of users that can operate in a given geographic area is limited. Where many users attempt simultaneous operation of their DECT telephones, system failure may occur whereby the telephones become inoperable.

As a result, improved methods and apparatuses for mobile communication devices are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
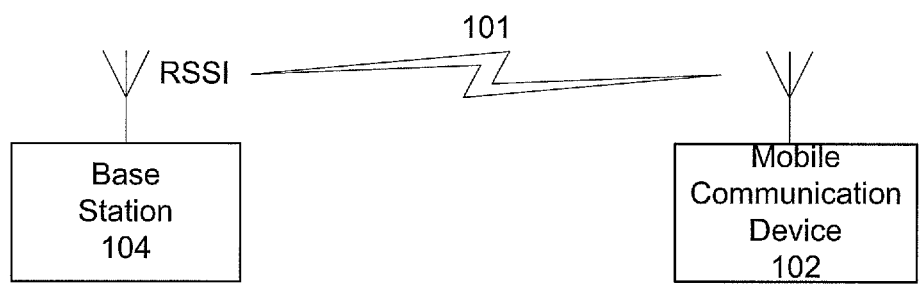
FIG. 1 illustrates multiple RF band operation of a mobile communication device utilizing RSSI in one example.

Methods and apparatuses for multiple RF band operation are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

In one example implementation, a system and method described herein minimizes the problem of RF interference between wireless headset systems in installations where many wireless telephony headset systems are deployed in a single location in a business office or call center environment. An RF circuit design is described which provides for frame-level simultaneous operation of the headset system in a first RF band and a second RF band within a single TDMA (time domain multiple access) frame, in which the operation in the first RF band and the second RF band at the frame level is performed by operation of the headset system in the first RF band in one or more timeslots of the TDMA frame, and in the second RF band in one or more different timeslots of the TDMA frame. The headset system communicates in half-duplex using one or more of the TDMA timeslots between its separate parts comprising a headset part and a base part using one or both of the first RF band and the second RF band. The headset system also detects the physical presence of other users sharing the spectrum in one or both of the first RF band and the second RF band by measuring the received signal strength indication (RSSI) level produced by receiving, using one or each of its separate parts, radio signals transmitted by other users in the TDMA timeslots that the headset system is not using for communication between its own separate parts. This capability under software control allows for constant monitoring of the presence of other users of the RF spectrum in both the first and second RF bands as well as the receive signal strength indication (RSSI) of the carrier or carriers and timeslot or timeslots that are currently in use for the headset's half-duplex communications between its own separate parts. These RSSI measurements provide information about the physical proximity between the headset system's separate parts and other users and about the physical separation of the headset system's own separate parts. A process which may be implemented in software or firmware selects the RF frequency band based on the RSSI measurements of the other-user signal levels and the RSSI measurements of the headset system's own transmissions. If the own-transmission RSSI level is above a RSSI threshold, the first RF band is utilized. If the user carrying the headset part of the headset system moves away from the base part of the headset system while in a call and the own-transmission RSSI drops below the RSSI threshold, the system will switch to the second RF band and seamlessly hand over to a carrier and timeslot or timeslots in the second RF band so as not to interfere with other units operating in the first RF band. Conversely, when the headset moves closer to its base and the RSSI threshold is reached, it will hand over from the second RF band to a carrier and timeslot or timeslots in the first RF band.

In one example implementation, the headset is operable both in an industrial, scientific and medical (ISM) band and operable in an RF band utilized by the Digital Enhanced Cordless Telecommunications (DECT) protocol. The headset implements a dual band radio to take advantage of the unique characteristics of each band.

The ISM bands are defined by the ITU-R. The defined ISM bands include the 915 MHz, 2.45 GHz, and 5.8 GHz bands used by cordless phones, Bluetooth, and IEEE 802.11 wireless LAN devices. The ISM bands generally have more channels than the DECT bands, thereby allowing more simultaneous users, but are more prone to interference from other wireless systems. To increase the maximum number of users in a single area for call centers and large enterprise offices, it is desirable to use frequencies in the ISM bands. The DECT bands, while having less interference, have fewer channels available. In order to maximize the number of users of a wireless system in a given area, a system that can use either band and switch during a call (also referred to herein as switching "on-the-fly") as conditions warrant is utilized. In one usage scenario, the ISM bands are used for short range, in-cubicle use for example, and the DECT bands are used only if the user leaves his cubicle or encounters interference in the ISM band while in the cubicle. Either band may be utilized at any time to optimize performance and avoid interference from other units as well as interference from 802.11 WiFi access points in the ISM bands deployed in the building.

In one example of this implementation, the base part of the headset system continually transmits a beacon signal in a timeslot of a carrier, whereby any one of several headsets or mobile devices receive and recognize the beacon via a unique identifier in the signal and locks onto the beacon signal to form an idle-lock state in which the headset and base are synchronized. Being in this idle-lock state allows the mobile device to speed up the voice communication link establishment process, and allows for incoming alerts to be transmitted to the headset. Once the headset and base are idle locked, the headset begins monitoring the RSSI levels of other users in channels and timeslots in both RF bands to determine which channels and timeslots are clearest to use. On system power up, the separate parts of the headset system (the headset and the base) begin operation in the DECT band. In a further example, the initial operation may be in the ISM band.

The DECT protocol is a TDMA protocol having multiple timeslots of operation as well as multiple carrier frequencies. It has the ability to switch channels and timeslots within the DECT band based on interference levels. Thus, during a call, the DECT protocol may switch the call to a lower interference DECT channel.

In one example operation, while the headset is docked it will be idle locked on an ISM channel and timeslot. If the headset is taken from the base while idle-locked, the system will switch to a DECT channel and timeslot when the signal weakens below a predetermined threshold. When the headset is brought to a location nearer to the base and the RSSI for the signal transmitted from the other end of the radio link goes above the threshold, the system will switch to an ISM channel and timeslot. The unit will operate in the same manner while in an active link as it does while idle-locked, with regard to band selection. The determination of when to switch to the other band is based on own-transmission RSSI level. The own-transmission RSSI level is measured in the timeslot or timeslots used for the half-duplex communications between the separate parts of the headset system in each TDMA frame, or from time to time. When the own-transmission RSSI level is high the ISM band is used, when it is low DECT is used. Hysteresis is used to keep the system from switching back and forth between bands while operating near the threshold. The RSSI level may be corrected for an offset between the two RF bands produced by different measurement hardware used for each band, or for the relative antenna efficiency or aperture for each of the bands.

Systems and methods described herein advantageously provide for the implementation of RF control algorithms that allow for very high density wireless installations such as call centers without any significant loss of range or interference from other units or other equipment operating the ISM bands. Seamless sharing of integrated hardware for obtaining service in both DECT and multiple ISM frequency bands is provided.

In one example, a method for dual radio frequency band operation includes operating a mobile communication device in a first radio frequency band, monitoring an own-transmission RSSI associated with the mobile communication device on the other end of the communications link, and switching operation of the mobile communication device to operation in a second radio frequency band responsive to the own-transmission RSSI crossing a threshold RSSI value.

In one example, a dual band mobile communication device in communication with another dual band device includes a processor, a first radio frequency band transceiver, a second radio frequency band transceiver, and an antenna. The dual band mobile communication device further includes a memory storing a radio frequency band selection application configured to monitor a proximity utilizing an RSSI value associated with a wireless signal transmitted by the communicating device, received at either the first radio frequency band transceiver or the second radio frequency band transceiver. Responsive to the proximity, the radio frequency band selection application operates the dual band mobile communication device in a first radio frequency band or a second radio frequency band.

In one example, a headset includes a microphone, a speaker, a processor, a first radio frequency band transceiver operable to transmit and receive signals in a first radio frequency band, and a second radio frequency band transceiver operable to transmit and receive signals in a second radio frequency band. The headset further includes a memory storing a radio frequency transceiver selection application configured to switch headset operation between the first radio frequency band transceiver and the second radio frequency band transceiver responsive to a monitored RSSI value crossing a threshold RSSI value.

FIG. 1 illustrates multiple RF band operation of a mobile communication device utilizing RSSI in one example. Although certain examples described herein refer to a headset, the apparatus and methods described are applicable to any radio system incorporating at least a mobile device, including mobile phones and other computing devices.

Referring now to FIG. 1, a system 100 includes a mobile communication device 102 and a base station 104 capable of wireless communication there between. Base station 104 is coupled to a telecommunications network. For example, base station 104 may be a landline phone, access point (AP), personal computer, USB dongle, or mobile phone. The network may be a communications network which may include a public switched telephone network (PSTN), a cellular network, an integrated services digital network (ISDN), a local area network (LAN), and/or a wireless local area network (WLAN), that support standards such as Ethernet, 802.11, and/or voice over Internet protocol (VoIP).

In one example, the access point includes a transceiver and a processor configured to allow a wireless device (e.g., mobile communication device 102) access to a network connected to the access point (e.g., via a 10/100 Ethernet RJ-45 port). The access point may be any device that allows wireless-equipped computers and other devices to communicate with a wired network. In one example, the access point is able to support the 802.11a, 802.11b, 802.11g and/or 802.11n wireless networking standards in particular. In other examples, the access point may be able to support other wireless networking standards.

The received signal strength indicator (RSSI) of a wireless link 101 between communicating elements 104 and 102 is measured and monitored over time and processed to determine which RF band to operate the communications link between the mobile communication device 102 and the Base Station 104. The RSSI measurements can be monitored either at the mobile communication device 102 or at the base station 104. If measured and monitored at the base station 104, the mobile communication device 102 can be configured to query the base station 104 as to what the RSSI is. If measured and monitored at the mobile communication device 102, the base station 104 can be configured to query the mobile communication device 102 as to what the RSSI is. In one example, the RSSI measurements are processed at the mobile communication device 102 to determine the appropriate mobile communication device operating band. In a further example, the RSSI measurements are processed at the base station 104 to determine the appropriate mobile communication device operating band.

The base station 104 and mobile communication device 102 both may monitor RSSI for different purposes. The base station 104 monitors interference from other users of either or both RF bands to determine the best channel and timeslot to broadcast a beacon on. The beacon is moved periodically to another channel and timeslot so all base stations do not broadcast on the same channel and timeslot. The mobile communication device 102 monitors own-transmissions link RSSI and other-user RSSI in order to select the best channel for communication and to handover to another channel and/or timeslot if it encounters interference. Since the mobile communication device 102 is exposed to more varying signals due to fade environments and moving into range of other systems it may be better suited to do the channel selection. The base station 104 and mobile communication device 102 are synchronized to each other so that the mobile communication device 102 always knows what channel, timeslot and RF band the base station 104 will be receiving on so a link for communication can be rapidly established. The base station 104 sends a quality message to the mobile communication device 102 to pick another channel and/or timeslot if it is encountering interference in receiving the signal from the mobile communication device 102. With this system the mobile communication device 102 has the information it needs to make the channel and/or timeslot selection.

Figure 2:
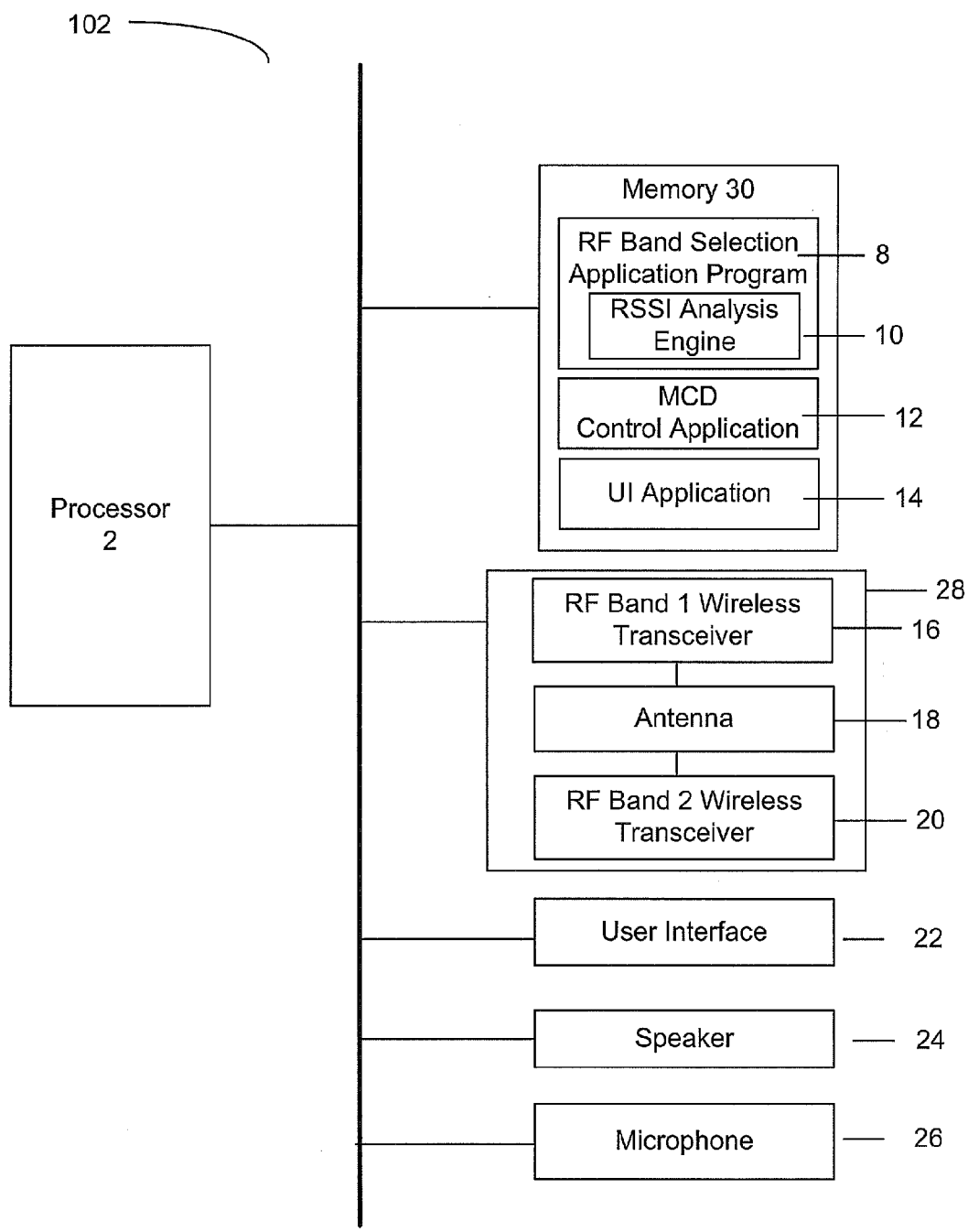
FIG. 2 illustrates a block diagram of a mobile communication device with a RF band selection application.

FIG. 2 illustrates a block diagram of a mobile communication device with a RF band selection application. Referring to FIG. 2 in conjunction with FIG. 1, a block diagram of an example of mobile communication device 102 is shown. Mobile communication device 102 includes a processor 2 operably coupled to a memory 30, a dual band radio 28, a user interface 22, a speaker 24, and a microphone 26. Dual band radio 28 includes circuitry for a RF band 1 wireless transceiver 16 and a RF band 2wireless transceiver 20. In the example shown in FIG. 2, an antenna 18 is shared by RF band 1 wireless transceiver 16 and RF band 2 wireless transceiver 20. In further examples, each RF band transceiver may utilize an independent antenna. In one example, the RF band 1 wireless transceiver 16 allows for a higher density of simultaneous users relative to the RF band 2 wireless transceiver 20, whereas the RF band 2 wireless transceiver 20 offers greater range. In one example, RF band 1 wireless transceiver 16 is an ISM band transceiver such as Bluetooth and RF band 2 wireless transceiver 20 is a DECT transceiver. In further examples, the RF band 1 wireless transceiver 16 and RF band 2 wireless transceiver 20 may vary based on the desired operating characteristics and usage of mobile communication device 102.

Processor 2 allows for processing data, in particular managing RSSI data between dual band radio 28 and memory 30 for determining whether to operate mobile communication device 102 using RF band 1 wireless transceiver 16 or RF band 2wireless transceiver 20. In one example, processor 2 is a high performance, highly integrated, and highly flexible system-on-chip (SOC) having signal processing functionality. Processor 2 may include a variety of processors (e.g., digital signal processors), with conventional CPUs being applicable.

Memory 30 may include a variety of memories, and in one example includes SDRAM, ROM, flash memory, or a combination thereof. Memory 30 may further include separate memory structures or a single integrated memory structure. In one example, memory 30 may be used to store passwords, network and telecommunications programs, and/or an operating system (OS). Memory 30 includes a mobile communication device control application 12 and a user interface application 14. User interface 22 allows for manual communication between the headset user and the headset, and in one example includes an audio and/or visual interface such that a prompt may be provided to the user's ear and/or an LED may be lit.

Memory 30 stores a RF band selection application program 8 executed by processor 2 to determine the operating RF band of the mobile communication device 102. RF band selection application program 8 includes an RSSI analysis engine 10. Utilizing RSSI analysis engine 10, RF band selection application program 8 is operable to process a plurality of RSSI values. In one example, a time weighted average of RSSI values is identified and compared to a threshold RSSI, where the threshold RSSI is a value above which the mobile communication device 102 is operated in a first RF band using RF band 1 wireless transceiver 16 and below which the mobile communication device is operated in a second RF band using RF band 2 wireless transceiver 20. Memory 30 may store RSSI values and predetermined threshold RSSI values for use by RF band selection application program 8 to determine the operating band of mobile communication device 102. The RF band selection application program 8 may implement a variety of algorithms to process the RSSI data and select the desired RF band. For example, hysteresis may be employed to prevent undesirable rapid switching between RF band 1wireless transceiver 16 and RF band 2 wireless transceiver 20.

In one example, the RF band selection application program 8 is configured to monitor a proximity utilizing an RSSI value associated with a wireless signal received at either the RF band 1 wireless transceiver 16 or the RF band 2 wireless transceiver 20. Responsive to the proximity, the RF band selection application program 8 operates the dual band mobile communication device 102 in a first radio frequency band or a second radio frequency band. For example, the proximity is a proximity between the dual band mobile communication device 102 and the base station 104. In one example, the proximity is a predetermined proximity delineating a near status or far status of the headset from the base station 104.

In one example, the RF band selection application program 8 is configured to monitor the proximity while the dual band mobile communication device 102 is in an idle-locked state, the idle-locked state utilizing either the first radio frequency band transceiver or the second radio frequency band transceiver. The RF band selection application program 8 is also configured to monitor the proximity while the dual band mobile communication device 102 is in a voice communication linked state.

In one example, the RF band selection application program 8 is further configured to monitor a plurality of interference levels in a plurality of channels in both the first radio frequency band and the second radio frequency band, wherein the RF band selection application program 8 is configured to select a low interference channel when switching headset operation between operation in the first radio frequency band and operation and the second radio frequency band. A constant scan is performed for interference levels for each time slot and for each carrier. In the DECT band, the process of scanning carriers for interference levels is set forth in the DECT regulatory protocol. In this TDMA system with 10 msec transmit framing, within the transmit frame there are twenty four time slots, with twelve for transmit and twelve for receive. For any individual time slot interference levels in both bands are scanned from time to time. In the ISM band, the carrier and timeslot scanning may be similarly configured. This process occurs for the current active band to switch to lower interference carriers within the same band. The scanning also occurs for the non-active band, so that when the system determines that the switch is to be made to the non-active band, the algorithm can select the best channel and timeslot to switch to within that band. In one example, two tables of interference levels are created, one for the first radio frequency band and one for the second radio frequency band. When RF band selection application program 8 determines a switch is to be made from one band to another, the tables are utilized to determine the carrier and timeslot with the lowest interference in the new band.

Figure 3:
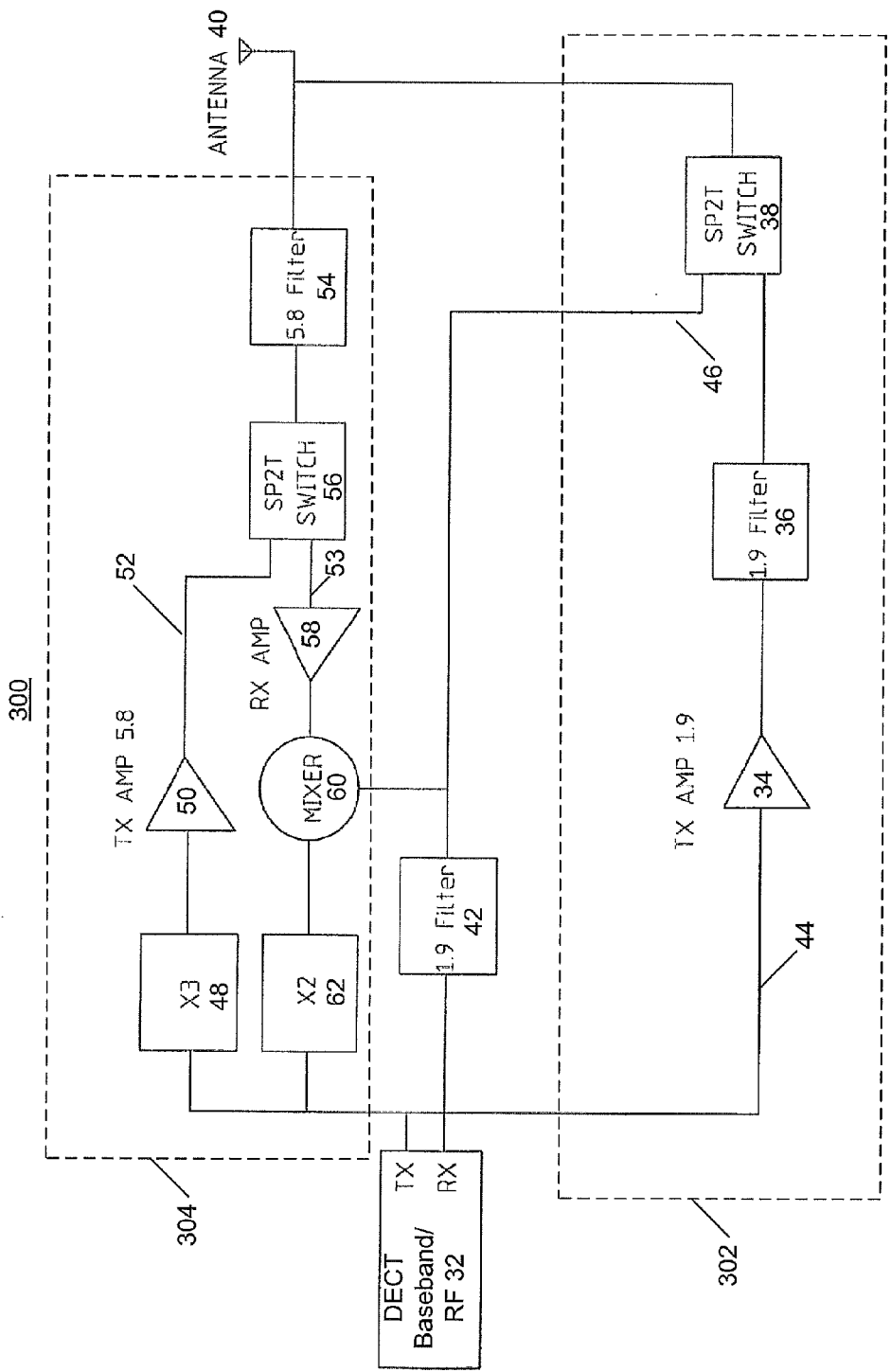
FIG. 3 illustrates a simplified dual RF band circuit block diagram.

FIG. 3 illustrates simplified dual RF band circuit 300 block diagram in one example. The dual RF band circuit 300 electronics are controlled by software that runs on a baseband microcontroller. The dual RF band circuit 300 allows for fast switching between the standard DECT band (1880 MHz-1900 MHz) or the UPCS band (1920-1930 MHz) and the ISM bands so that either band can be utilized for wireless communication by the mobile communication device. The mobile communication device includes the capability to measure RF signal strength on all carrier frequencies and all timeslots in either band for any timeslot, so that scanning can be done to avoid interference from other units that are within range of the receiver. The ability to operate on different timeslots in the same frame that use either the DECT band or the ISM band allows for increased user density and audio bandwidth in wireless office products.

Dual RF band circuit 300 includes DECT transceiver components 302 and ISM transceiver components 304. The DECT transceiver components 302 include a transmit amplifier 34, filter 36, and SP2T switch 38 along a DECT transmit line 44 coupled to a DECT baseband/RF integrated circuit (IC) 32. An antenna 40 is coupled to a SP2T switch 38, where the antenna 40 is switched between DECT transmit line 44 and a DECT receive line 46 via the SP2T switch 38. A filter 42 is coupled to DECT receive line 46 to filter a DECT receive signal received at the antenna 40 prior to input to the DECT baseband/RF IC 32. Filter 42 is utilized by both the DECT transceiver components 302 and ISM transceiver components 304.

The ISM transceiver components 304 include a frequency tripler X3 48, transmit amplifier 50, and SP2T switch 56 along the ISM transmit line 52 coupled to the DECT baseband/RF IC 32. In the example shown in FIG. 3, the ISM transceiver components 304 converts a DECT signal to the ISM band, 5.8 gigahertz in this example. On the receive path the circuitry converts the 5.8 GHz receive signal down to 1.9 GHz. In further examples, other frequency bands within the ISM band may be utilized. Alternatively the ISM block may be replaced with a dedicated ISM band transceiver IC to perform the ISM band operation. For example, a 2.4 GHz IC or a Bluetooth IC may be utilized in conjunction with the DECT baseband/RF IC 32.

The antenna 40 is coupled to a filter 54, where filter 54 is coupled to SP2T switch 56. Antenna 40 is switched between the ISM transmit line 52 and an ISM receive line 53 via SP2T switch 56. The ISM receive line 53 includes a receive amplifier 58 and mixer 60. Mixer 60 receives the output of receive amplifier 58 and an oscillator signal from frequency doubler X2 62 to output to output the ISM receive signal to filter 42 for input to DECT baseband/RF IC 32. The mixer 60 operates to down convert the frequency of the received ISM signal to the 1.9 GHz band.

In operation, during transmission utilizing DECT, frequency tripler X3 48 and frequency doubler X2 62 are deactivated and transmit amplifier 34 is activated. The output signal from DECT baseband/RF IC 32 is amplified by transmit amplifier 34 and filtered by filter 36. Filter 36 is a band pass or lowpass filter operable to filter out undesirable harmonics. During reception of signals utilizing DECT, a receive signal is received at the antenna 40 and transmitted to the filter 42 on the DECT receive line 46, where the SP2T switch 38 is set to the receive path during signal reception. During DECT receive, the mixer 60 in the ISM transceiver components 304 is deactivated and does not affect the DECT receive signal. Following the filter 42 on the receive path, the receive signal is provided to DECT baseband/RF IC 32.

In operation, during transmission utilizing the ISM band, the SP2T switch 56 is set to transmit, coupling the transmit path 52 to the antenna 40. The frequency of transmit signal output from the DECT baseband/RF IC 32 is multiplied by frequency tripler X3 48. The transmit signal is then amplified by transmit amplifier 50. The amplified transmit signal is filtered by filter 54 and transmitted via the antenna 40.

During reception utilizing the ISM band, the SP2T switch 56 is set to receive, coupling the receive line 53 to the antenna 40. The signal received at the antenna 40 is filtered by filter 54 and amplified by receive amplifier 58. During receive, a signal is output from DECT baseband/RF 32 and used as a local oscillator. The signal frequency is doubled by frequency doubler X2 62 to produce a 3.8 GHz signal and mixed with the output of the receive amplifier 58 to produce a signal which is output to filter 42, which is then provided to the DECT baseband/RF IC 32.

Figure 4A:
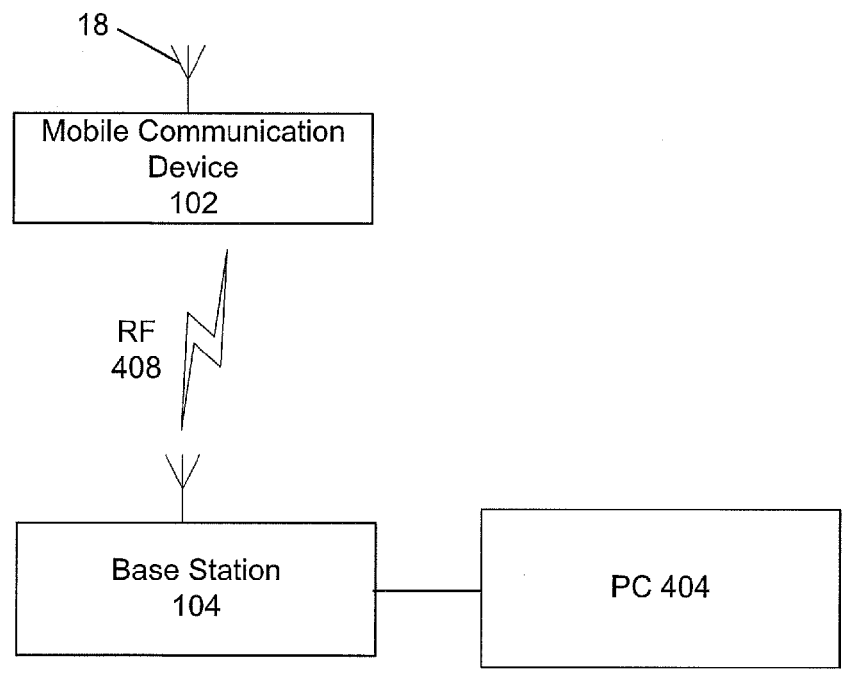
FIG. 4A illustrates a system for multiple RF band operation of the mobile communication device shown in FIG. 2 in one example implementation.
Figure 4B:
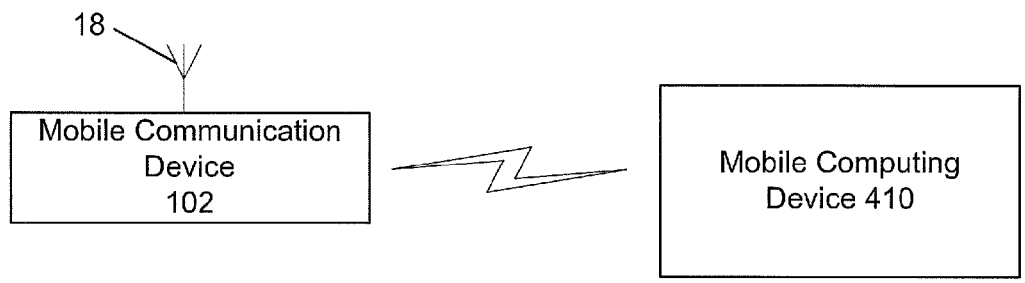
FIG. 4B illustrates a system for multiple RF band operation of the mobile communication device shown in FIG. 2 in a further example implementation.

FIG. 4A illustrates a system for multiple RF band operation of the mobile communication device shown in FIG. 1 in one example implementation. Referring to FIG. 4A, base station 104 is coupled to a computer 404 (also referred to herein as a "PC" for convenience, though computer 404 may be any type of computing device). In one example, base station 104 is coupled to personal computer 404 using a USB interface. FIG. 4B illustrates a system for multiple RF band operation of the mobile communication device shown in FIG. 1 in a further example implementation. Referring to FIG. 4B, base station 104 shown in FIG. 1 is a mobile computing device 410. For example, mobile computing device 410 may be a handset, mobile cell phone, smartphone, or laptop computer.

Figure 5:
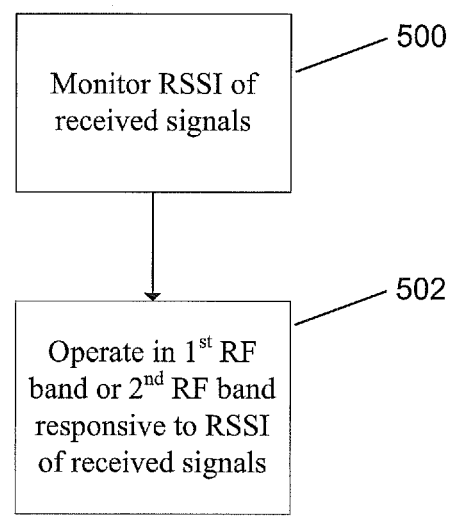
FIG. 5 is a flow diagram illustrating a process for operating in a first RF band or a second RF band based on RSSI in one example.

FIG. 5 is a flow diagram illustrating a process for operating in a first RF band or a second RF band based on RSSI in one example. At block 500, the RSSI of received signals are monitored. In one example, monitoring the RSSI comprises calculating a weighted average of RSSI values. At block 502, a device is operated in a first radio frequency band or a second radio frequency band responsive to the RSSI of the received signals. In one example, operation is switched between the first radio frequency band and the second radio frequency band responsive to the RSSI crossing a threshold RSSI value. In one usage application, the mobile communication device operation is switched to operation in the second radio frequency band when the RSSI drops below the threshold RSSI value. Operation is switched from the second radio frequency band to the first radio frequency band when the RSSI rises above the threshold RSSI value.

Figure 6:
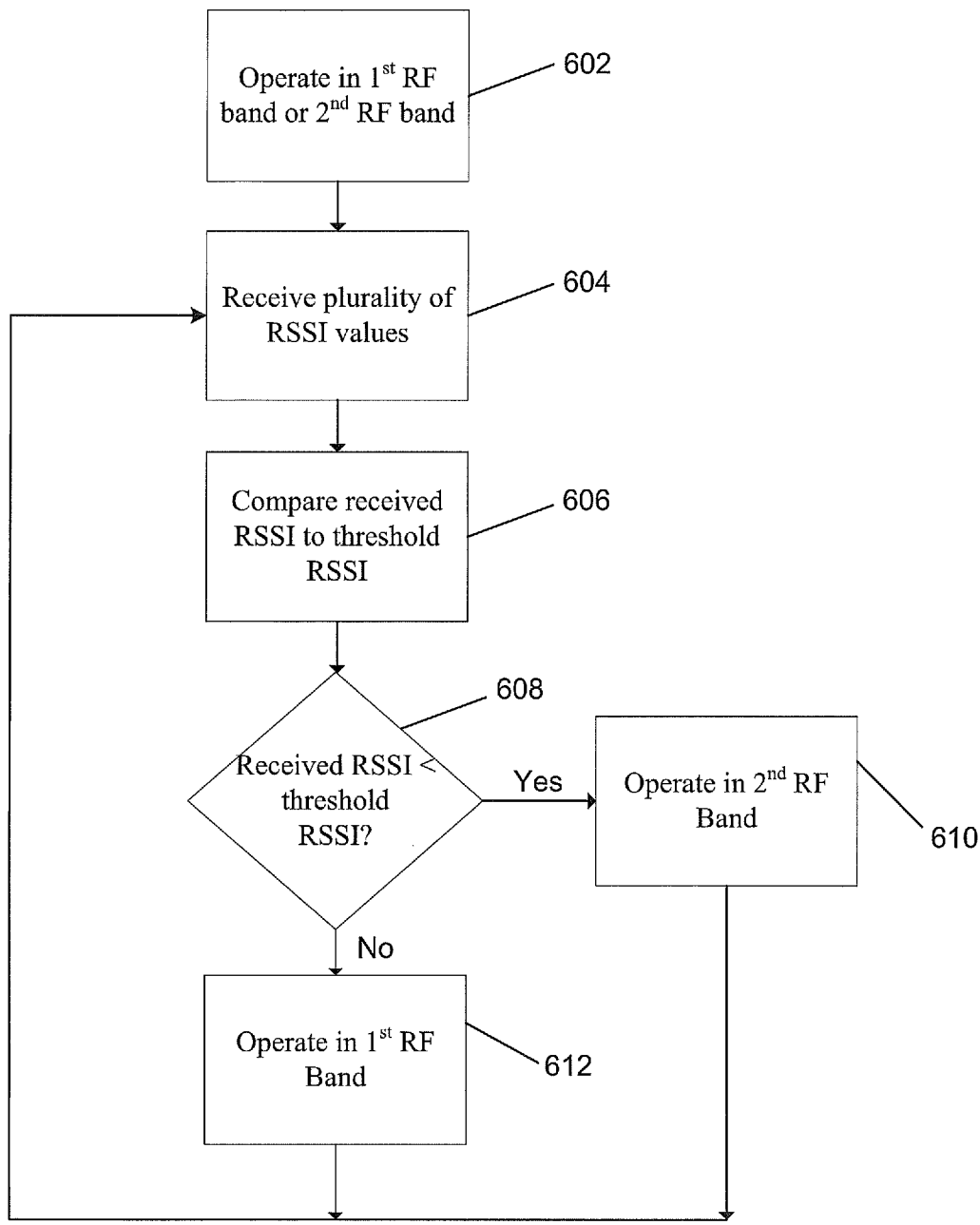
FIG. 6 is a flowchart illustrating a process for operating in a first RF band or a second RF band based on RSSI in a further example.

FIG. 6 is a flowchart illustrating a process for operating in a first RF band or a second RF band based on RSSI in a further example. At block 602, a mobile communication device is operated in either a first radio frequency band or a second radio frequency band. In one example, the mobile communication device is operated in an idle-locked state. Alternatively, the mobile communication device is operated in a voice communication linked state.

In one example, the first radio frequency band is an ISM band and the second radio frequency band is a DECT band. At block 604, a plurality of RSSI values are received. In one example, the mobile communication device is a headset and the plurality of RSSI values received are associated with communications between the headset and a headset base. At block 606, the received RSSI values are compared to a threshold RSSI. At decision block 608, is determined whether the received RSSI values are less than a threshold RSSI. If yes at decision block 608, at block 610, the mobile communication device is operated in the second radio frequency band. Following block 610, the process returns to block 604. If no at decision block 608, at block 612, the mobile communication device is operated in the first radio frequency band. Following block 612, the process returns to block 604.

The operation of the mobile communication device may be switched between the first RF band and the second RF band responsive to a monitored RSSI value crossing the threshold RSSI value when the headset is in either an idle-locked state or a voice communication linked state.

Figure 7:
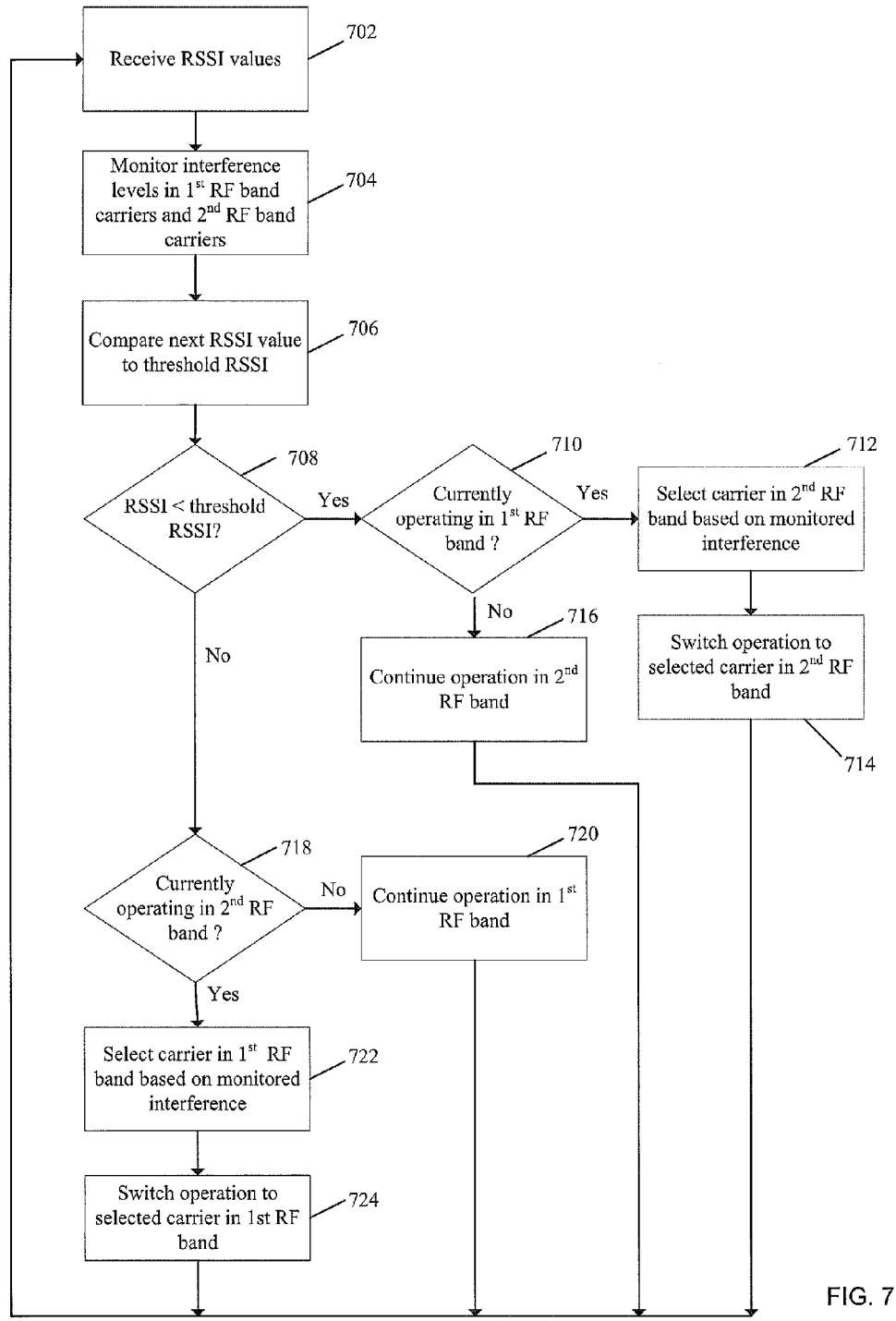
FIG. 7 is a flowchart illustrating a process for operating in a first RF band or a second RF band based on RSSI in a further example.

FIG. 7 is a flowchart illustrating a process for operating in a first RF band or a second RF band based on RSSI in a further example. At block 702, RSSI values are received. At block 704, interference levels are monitored in the first radio frequency band channels and the second radio frequency band channels. At block 706, the next received RSSI value, where the next RSSI value may be a time weighted average of RSSI values, is compared to a threshold RSSI value. At decision block 708, it is determined whether the next RSSI is less than a threshold RSSI. If yes at decision block 708, at decision block 710 it is determined whether the mobile communication device is currently operating in the first radio frequency band. If yes at decision block 710, at block 712 a channel is selected in the second radio frequency band based on the monitored interference levels. At block 714, operation is switched to the selected channel in the second radio frequency band. Following block 714, the process returns to block 702. If no at decision block 710, at block 716 operation continues in the second radio frequency band. Following block 716, the process returns to block 702.

If no at decision block 708, at decision block 718 it is determined whether the mobile communication device is currently operating in the second radio frequency band. If no at decision block 718, at block 720 operation continues in the first radio frequency band. Following block 720, the process returns to block 702. If yes at decision block 718, at block 722 a channel is selected in the first radio frequency band based on the monitored interference levels. At block 724, operation is switched to the selected channel in the first radio frequency band. Following block 724, the process returns to block 702.

Figure 8:
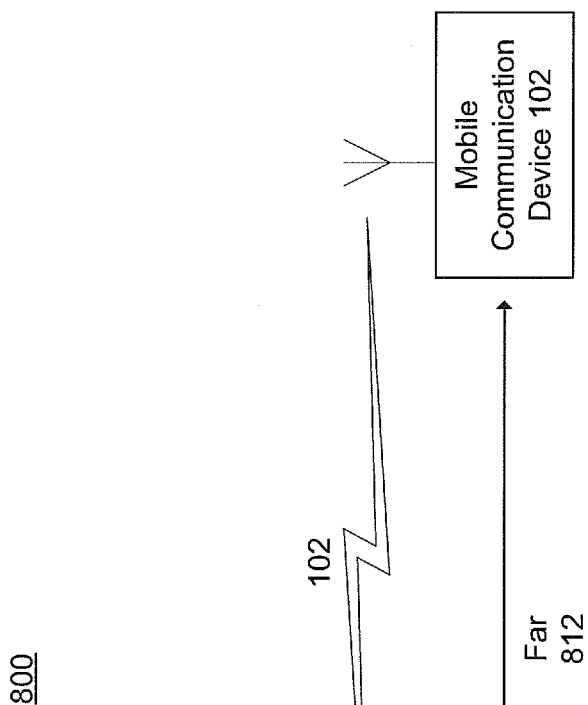
FIG. 8 illustrates a usage scenario for multiple RF band operation where a mobile communication device transitions between a NEAR state and FAR state.

FIG. 8 illustrates a usage scenario for multiple RF band operation where a mobile communication device transitions between a NEAR state and FAR state. A system 800 includes a base station 104 and mobile communication device 102 capable of wireless communication there between as previously described. The received signal strength indicator of the wireless link 101 is measured and monitored to determine the proximity of the mobile communication device 102 from the base station 104.

In system 800, a proximity boundary 806 establishes a range from base station 104 below which mobile communication device 102 is considered to be in a NEAR state 810 and beyond which mobile communication device 102 is considered to be in a FAR state 812. System 800 utilizes RSSI values of signals received over wireless link 101 to determine whether mobile communication device 102 is in a NEAR state or FAR state using methods described herein. Responsive to this NEAR/FAR determination, mobile communication device 102 is operated in either a first RF band or a second RE band. The NEAR/FAR proximity boundary 806 may be automatically configured or the user may be set by the user. For example, the user may set the NEAR/FAR proximity boundary 806 based upon the density of other mobile communication devices in the user's planned device operation area.

While the exemplary embodiments of the present invention are described and illustrated herein, it will be appreciated that they are merely illustrative and that modifications can be made to these embodiments without departing from the spirit and scope of the invention. For example, a mobile communication device base may take a variety of forms and may be integrated with other devices, whereby such devices may be considered to be the mobile communication device for purposed described herein. Thus, the scope of the invention is intended to be defined only in terms of the following claims as may be amended, with each claim being expressly incorporated into this Description of Specific Embodiments as an embodiment of the invention.

What is claimed is:

1. A method for dual radio frequency band operation comprising:
   operating a mobile communication device in a first radio frequency band;
   monitoring a RSSI associated with the mobile communication device;
   monitoring a plurality of interference levels in a plurality of channels in a second radio frequency band while operating in the first radio frequency band; and
   switching operation of the mobile communication device to operation in a second radio frequency band responsive to the RSSI crossing a threshold RSSI value and selecting a channel within the second radio frequency band based on the plurality of interference levels.

2. The method of claim 1, wherein the first radio frequency band is an ISM band and the second radio frequency band is a DECT band.

3. The method of claim 2, wherein switching operation of the mobile communication device to operation in the second radio frequency band occurs when the RSSI drops below the threshold RSSI value, the method further comprising switching from the second radio frequency band to the first radio frequency band when the RSSI rises above the threshold RSSI value.

4. The method of claim 2, wherein operating a mobile communication device in a first radio frequency band comprises operating the mobile communication device in a first radio frequency band idle-locked state and operation in a second radio frequency band comprises operating the mobile communication device and a second radio frequency band idle-locked state.

5. The method of claim 2, wherein operating a mobile communication device in a first radio frequency band comprises operating the mobile communication device in a first radio frequency band voice communication linked state and operation in a second radio frequency band comprises operating the mobile communication device and a second radio frequency band voice communication linked state.

6. The method of claim 1, wherein the mobile communication device is a headset and the RSSI is associated with communications between the headset and a headset base.

7. The method of claim 1, wherein monitoring the RSSI comprises calculating a weighted average of RSSI values.

8. A headset comprising:
a microphone;
a speaker;
a processor;
a first radio frequency band transceiver operable to transmit and receive signals in a first radio frequency band;
a second radio frequency band transceiver operable to transmit and receive signals and a second radio frequency band; and
a memory storing a radio frequency transceiver selection application configured to monitor a plurality of interference levels in a plurality of channels in both the first radio frequency band and the second radio frequency band and switch headset operation between the first radio frequency band transceiver and the second radio frequency band transceiver responsive to a monitored RSSI value crossing a threshold RSSI value, wherein the radio frequency transceiver selection application is configured to select a low interference channel identified from the plurality of interference levels when switching headset operation between the first radio frequency band transceiver and the second radio frequency band transceiver.

9. The headset of claim 8, wherein the threshold RSSI value is associated with a proximity between the headset and a headset base device.

10. The headset of claim 9, wherein the headset base device is a personal computer or a mobile phone.

11. The headset of claim 9, wherein the proximity is a predetermined proximity delineating a near status or far status of the headset from the headset base device.

12. The headset of claim 8, wherein the first radio frequency band transceiver is an ISM band transceiver at the second radio frequency band transceiver is a DECT transceiver.

13. The headset of claim 8, wherein the radio frequency transceiver selection application switches operation of the headset to operation in the second radio frequency band occurs when the RSSI drops below the threshold RSSI value, and switches operation from the second radio frequency band to the first radio frequency band when the RSSI rises above the threshold RSSI value.

14. The headset of claim 8, wherein the radio frequency transceiver selection application is configured to switch headset operation between the first radio frequency band transceiver and the second radio frequency band transceiver responsive to a monitored RSSI value crossing a threshold RSSI value when the headset is in a idle-locked state.

15. The headset of claim 8, wherein the radio frequency transceiver selection application is configured to switch headset operation between the first radio frequency band transceiver and the second radio frequency band transceiver responsive to a monitored RSSI value crossing a threshold RSSI value when the headset is in a voice communication linked state.

* * * * *